United States Patent
Vrijsen

(10) Patent No.: US 8,601,461 B2
(45) Date of Patent: Dec. 3, 2013

(54) MULTIPLE USER CONTROL OF A DOWN LOADABLE APPLICATION

(75) Inventor: Alexander P. P. Vrijsen, Waalre (NL)

(73) Assignee: Koninklijke Electronics N.V., Eindhoven (NL)

(*) Notice: Subject to any disclaimer, the term of this patent is extended or adjusted under 35 U.S.C. 154(b) by 1320 days.

(21) Appl. No.: 11/908,023

(22) PCT Filed: Mar. 2, 2006

(86) PCT No.: PCT/IB2006/050661
§ 371 (c)(1),
(2), (4) Date: May 15, 2008

(87) PCT Pub. No.: WO2006/095290
PCT Pub. Date: Sep. 14, 2006

(65) Prior Publication Data
US 2009/0113417 A1    Apr. 30, 2009

Related U.S. Application Data

(60) Provisional application No. 60/659,610, filed on Mar. 8, 2005.

(51) Int. Cl.
*G06F 9/45* (2006.01)
(52) U.S. Cl.
USPC .......................... 717/168; 717/174; 348/14.05
(58) Field of Classification Search
USPC .......................................................... 717/168
See application file for complete search history.

(56) References Cited

U.S. PATENT DOCUMENTS

| | | | | |
|---|---|---|---|---|
| 4,751,581 A * | 6/1988 | Ishiguro et al. | ............... | 348/734 |
| 5,727,070 A * | 3/1998 | Coninx | .................. | 381/321 |
| 6,359,661 B1 * | 3/2002 | Nickum | .................. | 348/734 |
| 6,557,173 B1 * | 4/2003 | Hendricks | .................. | 725/142 |
| 6,570,507 B1 * | 5/2003 | Lee et al. | .................. | 340/12.29 |
| 6,774,813 B2 | 8/2004 | Van Ee et al. | | |
| RE38,598 E * | 9/2004 | Frese et al. | .................. | 709/208 |
| 6,980,082 B2 * | 12/2005 | Ueda et al. | .................. | 340/5.72 |
| 7,031,396 B2 * | 4/2006 | Miwa | .................. | 375/259 |
| 7,260,829 B1 * | 8/2007 | Hendricks et al. | .......... | 725/152 |
| 7,266,777 B2 * | 9/2007 | Scott et al. | .................. | 715/762 |
| 2002/0101358 A1 | 8/2002 | DeBolster et al. | | |

(Continued)

FOREIGN PATENT DOCUMENTS

| JP | 2002354284 | 12/2002 |
|---|---|---|
| WO | 0111869 A1 | 2/2001 |
| WO | 0120572 A1 | 3/2001 |
| WO | 0147247 A2 | 6/2001 |

*Primary Examiner* — Wei Zhen
*Assistant Examiner* — Matthew Brophy

(57) ABSTRACT

Control of an operation of a multimedia terminal by an application, for example, a game or interactive television module, using remote control input signal is provided. An application is downloaded (S1), input signals from remote control units (RC-1, RC-2, RC-N) are received (S3) at the multimedia terminal, a message, including a source indication indicating the remote control from which the input signal was received, is sent (S5) to the downloaded application. According to the downloaded application, the operation of the multimedia terminal is controlled (S6) based on the source indication. The message may be sent to the downloaded application by an application program interface-based module resident at the multimedia terminal. A disable signal to disable a key could be transmitted to one or more of the remote control devices, for example, to disable the key for a specified time or a specified turn of a user.

17 Claims, 2 Drawing Sheets

(56) References Cited

U.S. PATENT DOCUMENTS

| | | | |
|---|---|---|---|
| 2002/0159753 A1* | 10/2002 | Wissman | 386/67 |
| 2003/0014164 A1* | 1/2003 | Shin | 701/2 |
| 2003/0048757 A1* | 3/2003 | Accarie et al. | 370/257 |
| 2003/0103088 A1* | 6/2003 | Dresti et al. | 345/835 |
| 2003/0108111 A1* | 6/2003 | Miwa | 375/259 |
| 2003/0172283 A1* | 9/2003 | O'Hara | 713/186 |
| 2004/0070625 A1 | 4/2004 | Palombo et al. | |
| 2005/0060232 A1* | 3/2005 | Maggio | 705/14 |
| 2005/0128353 A1* | 6/2005 | Young et al. | 348/588 |
| 2006/0070095 A1* | 3/2006 | Newton et al. | 725/27 |
| 2006/0152401 A1* | 7/2006 | Spilo | 341/176 |
| 2007/0180074 A1* | 8/2007 | Lathrop et al. | 709/222 |
| 2009/0228911 A1* | 9/2009 | Vrijsen | 725/14 |

\* cited by examiner

MULTIPLE USER CONTROL OF A DOWN LOADABLE APPLICATION

The present invention relates to the field of multimedia terminal control, multiple user control of a terminal, and control of a multimedia terminal by a downloaded application.

A multimedia terminal, such as an MHP (multimedia home platform) or OCAP, a set-top box for a television, a television, a DVD (digital video disk) player, or a PVR (personal video recorder) or the like, allow a user to download applications to experience multimedia presentations or applications on the multimedia terminal. For example, an application such as a game, an interactive commercial, or an interactive television application may be downloaded from a network, such as the Internet or the download application may be filtered from the broadcast signal (which is often the case in an MHP/OCAP environment or loaded from a DVD, Blu-ray disk or HD-DVD media player, to be played on the multimedia terminal. Such a multimedia terminal may contain an API (application programming interface) that allows the downloaded application to control the operation of the multimedia terminal. Some types of downloaded applications require or facilitate use by more than one user at time. Also, some downloaded applications may allow multiple users to provide input, such as commands to a game or information to a quiz show, by way of the remote control devices, such as a keypad, a keyboard, a joystick or the like.

Prior art system exist that provide for controlling a terminal via more than one remote control unit. For example, Norikazu, Japanese Patent Application Publication No. 2002-354284 discloses that each user may enter his or her user ID code into a remote control for storage in the memory of the remote control, and that commands from the remote control are then transmitted to a digital broadcast receiver and then transmitted to a broadcast center for a TV quiz program. Further, Palombo et al., U.S. Patent Application Publication No. 2004/0070625, discloses a game platform with joysticks connected to each side, such that the connection of the joystick to a particular side determines the identification of the player. Sevat, WO 01/47247, discloses a remote control in which a user may store in advance a code, or the manufacturer may store a code in advance, such that the remote control from which commands are transmitted to a television may be identified by the code stored, in order to control a split screen functionality in which a portion of the screen is used to display a program for first user and a second portion to display a program for a second user. Leermakers, WO 01/11869, discloses that a TV may function to download and store Java applets on an intelligent remote control used as a standalone application, such as a game, such that the remote control may then be used independently to play the game using the downloaded applet, without further instruction from the television.

However, none of these references discloses multiple remote controls inputting to a downloaded application that is controlling a multimedia terminal. Further, none of these references discloses an extension of an API used to determine the source of the remote control input signal, such as commands from multiple remote controls, to support control by the downloaded application of a multimedia terminal.

Provided are a method, system, device, apparatus, and a computer-readable medium that embodies or carries out the functions of multi-user multimedia terminal control.

Controlling an operation of a multimedia terminal by an application using remote control input signal is provided. An application is downloaded via a network to the multimedia terminal, input signals from remote control units are received at the multimedia terminal, a message is sent to the downloaded application, the message including a source indication, based on the input signal, indicating from which remote control the input signal was received; and according to the downloaded application, the operation of the multimedia terminal is controlled based on the source indication.

Further, the message may be sent to the downloaded application by an application program interface-based module resident at the multimedia terminal.

Also, the message may include a type indication indicating a type of the remote control from which the input signal was received, for example, whether the remote control is of a keypad, a keyboard, a joystick type, or a combination of such types of remote controls.

The message may further include a key indication indicating a key, or a combination of keys, such as (Shift, ctrl, or the like, plus a key) of the remote control from which the input signal was received.

In addition, a disable signal to disable a key could be transmitted to one or more of the remote control devices by the multimedia terminal, for example, to disable the key for a specified time or a specified turn of a user in an interactive game or module.

The downloaded application may include, for example, a game module or an interactive television module.

The following discussion and the foregoing figures describe embodiments of Applicant's invention as best understood presently by the inventors however, it will be appreciated that numerous modifications of the invention are possible and that the invention may be embodied in other forms and practiced in other ways without departing from the spirit of the invention. Further, features of embodiments described may be omitted, combined selectively or as a whole with other embodiments, or used to replace features of other embodiments, or parts thereof, without departing from the spirit of the invention. The figures and the detailed description are therefore to be considered as an illustrative explanation of aspects of the invention, but should not be construed to limit the scope of the invention.

Figure 1:
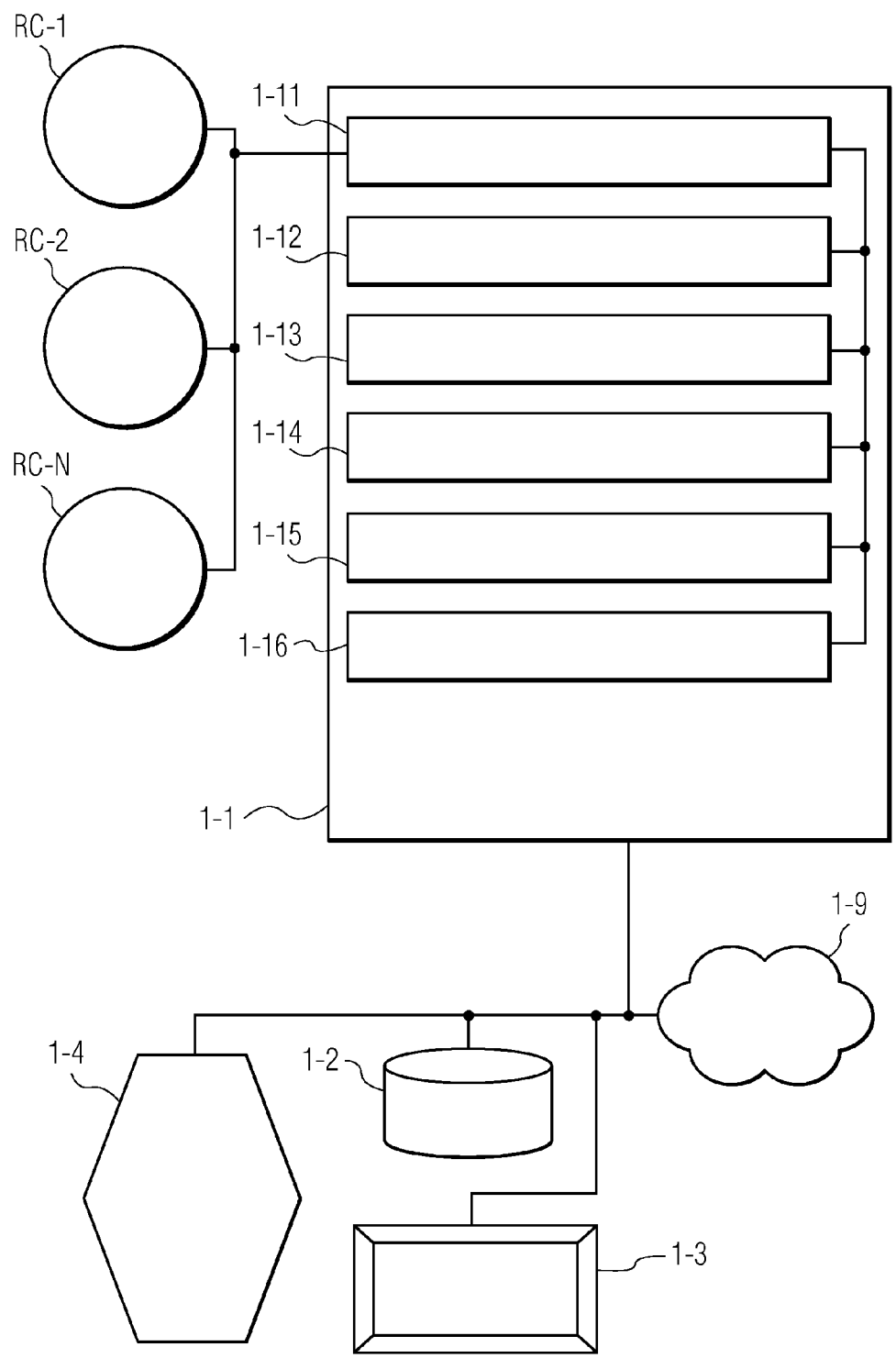
FIG. 1 is a schematic view of a multimedia terminal control system according to an embodiment of the present invention.

As shown in FIG. 1, the multimedia terminal control 1-1 includes several modules, which will be described below. Modules of the multimedia terminal control 1-1, or portions thereof, may be comprised of hardware, software, firmware, or a combination of the foregoing, however some modules may be comprised of hardware for example, while other modules may be comprised of software, firmware or a combination thereof. The multimedia terminal may comprise, for example, a television, a television set-top box, an MHP (multimedia home platform), a DVD player, a CD player, a personal computer, handheld device, a portable entertainment device, an MP3 player, a home entertainment center, a stereo system, a personal video recorder, or combination of the foregoing devices, or the like.

It is to be understood that modules of the multimedia terminal control 1-1 need not all be located or integrated with the multimedia terminal on the same device. A distributed architecture is also contemplated for the multimedia terminal control 1-1, which may "piggy-back" off of suitable modules provided by existing devices.

The following description will refer to a multimedia terminal control 1-1 that is physically integrated with or connected to a database 1-2, with/to a playback device 1-4, and with/to a display 1-3 via a wired or wireless connection thereto. The database 1-2 may be embodied as a storage device such as on a hard drive of a personal computer, a personal video recorder, an entertainment system, an electronic organizer, a personal handheld device, a Jaz drive, or as a disk drive. It will be understood that the database 1-2 may include several storage devices that are connected, such that organization or grouping of content items on two or more of such devices is possible. For example, the data may be distributed over devices in a peer-to-peer network. It will further be understood that the database may be understood to include one or more storage media, such as disks, including CDs, DVDs, zip disks, floppy disks, data cartridges, or the like, which can be loaded onto and retrieved by the database 1-2. However, it will be understood that the multimedia terminal control 1-1 is also capable of retrieving content via a network (not shown), such as a LAN, WAN, the internet, wireless network or the like, and that the database 1-2 may be remotely connected, such as via a network, including the internet. In addition, the downloaded application may be obtained from a data stream obtained via a television, radio, satellite or other type of broadcast signal, including, for example, a Web broadcast (Webcast). A display 1-3 and a playback device 1-4 may similarly be integrated with the multi-user playlist generating system 1-1 or with the multimedia terminal, or may be connected in one or more of the ways described above. The display 1-3 may in addition include flat panel displays, screens or monitors, including CRT screens, LCD, Plasma displays, projection displays and the like, while the playback device 1-4 may include speakers of any type suitable to carry out the purposes of the present invention. As shown in FIG. 1, the multimedia terminal control 1-1 may include a number of modules, including a user interface 1-11 which receives input from a number of users via several remote control units, including remote control 1, RC-1, remote control 2, RC-2 and remote control N, RC-N; an application installer 1-12, which installs into a memory, such as a RAM associated with a multimedia terminal, the downloaded application; an input signal processor 1-13; a message generator 1-14, a downloaded application module 1-15; and an output 1-16 which provides output signals, for example to the display 1-3, the database 1-2, the playback device 1-4, or to the network 1-9. It will be understood that any number of remote controls may be used, such that the system may include a remote control N, RC-N, where N is any integer greater than 1, in addition to the first remote control.

Figure 2:
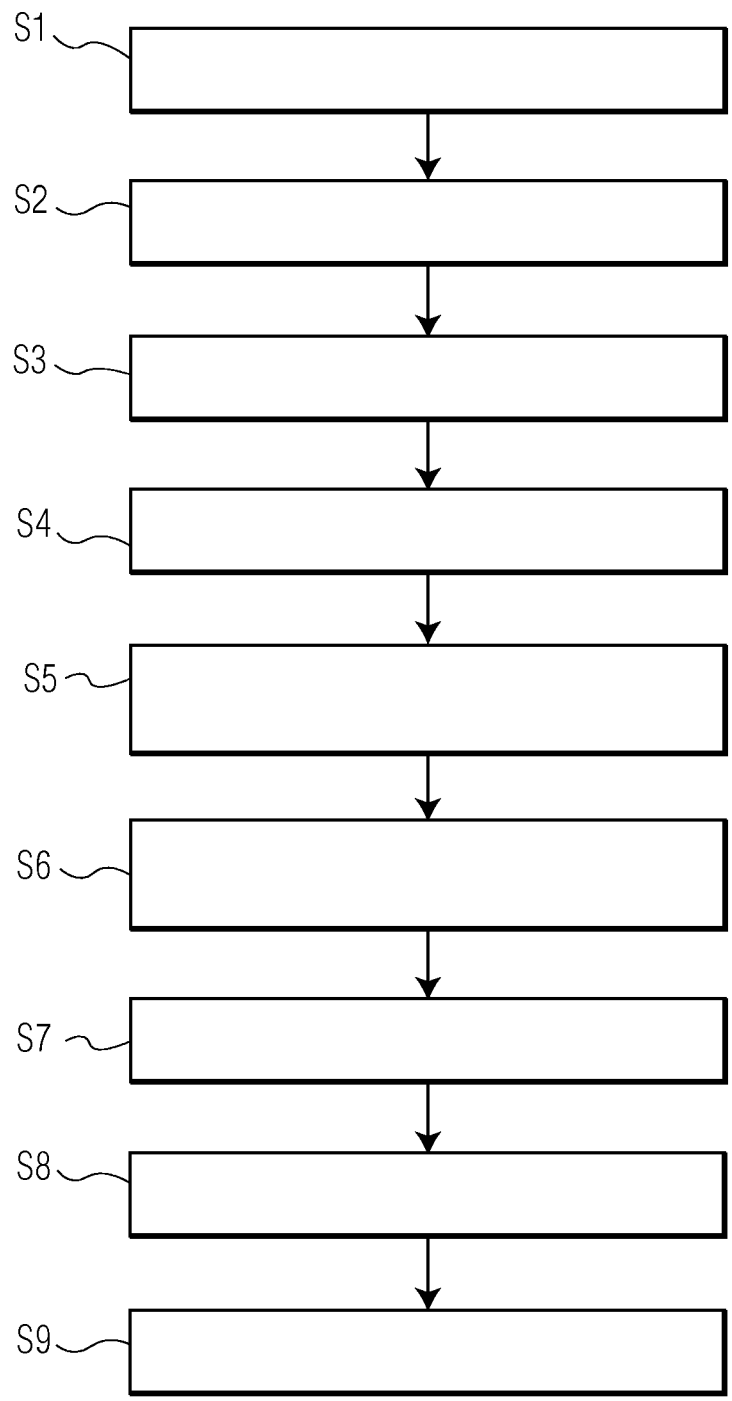
FIG. 2 is a flowchart showing an operation of a system according to the present invention.

An operation of a multimedia terminal control 1-1 will now be described with reference to FIGS. 1-2. At S1, an application is downloaded from the network 1-9, such as the Internet, by application installer 1-12, and the downloaded application is installed at S2, for example to the multimedia terminal or to a device connected to or networked with the multimedia terminal. According to an embodiment of the present invention, for example, in an MHP environment, in which a digital TV signal (data stream) contains downloadable applications (in addition to the audio and video data), these downloadable applications are filtered from the stream, and then may be verified and stored. Therefore, as used herein, the term "installation" is to be understood broadly as making available an application from downloadable application data. Such a downloaded application may comprise an applet or other software module that facilitates a game played by users on the multimedia terminal, or an interactive television module, for example, a TV quiz show application to which users can submit responses, or some other type of module for a multimedia terminal.

At S3, an input signal, such as a command, an information input, or other type of input is received from a remote control, such as remote control 1, RC-1, by user interface 1-11 of the multimedia terminal control 1-1. For example, if the downloaded application comprises game software, then input from the remote control may be a command to move the cursor on the of the multimedia terminal screen, such as display 1-3, received from a joystick. If the downloaded application comprises an interactive television module, such as a quiz show response system, then the input signal received from the remote control may include, for example an answer, such as "yes" or "choice D", received from a keypad or keyboard entered by a user operating the remote control. As used herein, the term "input signal" may sometimes be used for such various types of input received from the remote control, including a command, input to an interactive television module, such as can answer for a quiz show, data or information input, by user selection, some combination of the foregoing, or some other type of input or entry received from the remote control.

According to an embodiment of the present invention, the received RC signal corresponds directly to a key, for example, a digit, up/down arrow, or the like, that has been activated (or to a set of keys that have been activated). Thus, user interface 1-11 need not do the mapping to "choice D"; this may be done by the downloaded application: the input signal processing block, which may be understood as a part of the user interface 1-11 or as outside of it, receives the input signal, which identifies it as the corresponding key. The key data is passed to message generator 1-14 which in turn generates a message for the downloaded application. Accordingly, the downloaded application "knows" that for example that the up-button was pressed, and the downloaded application "knows" that "choice D" had been highlighted, so now it can instruct user interface 1-11 (graphics for the display may be considered as part of the user interface 1-11 for purposes of this paragraph) to highlight the choice above, i.e. "choice C". In turn, when the user presses "OK", the downloaded application receives a corresponding message from message generator 1-14 and knowing that "C" was highlighted, the downloaded application can now evaluate whether "C" was a correct answer.

Once the input signal from the remote control is received at S3 by user interface 1-11, input signal processor 1-13 at S4 processes the input signal to determine the nature of the input signal, such as whether it is an operation command intended for the downloaded application, and determines a source of the input signal, such as the transmitting remote control. According to an embodiment of the present invention, such processing is performed by message generator. For example, at S4 it may be determined that remote control 1, RC 1, transmitted to the input signal. Such determination may be carried out in a number of ways, based for example, on a distinguishing IR frequency or sound wave frequency assigned to each remote control, a remote control code that identifies the remote control entered by the user or pre-entered at a manufacturer's facility, or in some other manner.

In addition to determining the source remote control for the input signal, at S4 the type of remote control that has transmitted to the input signal, such as a joystick, a keypad, such as a traditional remote control used to control a conventional television, or a keyboard or the like, may further be determined. One or more of the remote control units may also be configured as some type of remote control other than a joystick, a keypad, or a keyboard, or a combination of the foregoing. One or more of the remote control units may also be an intelligent remote control unit with a processor capable of executing applications as a standalone device, and may include a display, speakers, headphones, or the like. Further, one or more of the remote units may comprise some other type of device, such a handheld organizer or MP3 player.

Also, the key or set of keys of the remote control that was (were) pressed or otherwise activated to initiate transmission of the input signal may further be determined. For instance, keys of the remote control may be selectively coded, and such codes may be transmitted (as prefixes or suffixes or interleaved or in some other format) with the input signal data, so that the type of the transmitting remote control and/or the key may be determined. It will be understood that the term "key" as used herein may also include controls other than buttons, such as knobs, dials, directional arrows, a mouse or track pad, soft keys provided on a display of the remote control unit, voice activated controls, or the like.

At S5, a message is generated and sent to the downloaded application by message generator 1-14. The message sent includes a command or data or the like extracted from the input signal, as discussed above, together with a source identifier identifying the transmitting remote control. According to an embodiment of the present invention, if the downloaded application is a Java applet, or some other type of software module, then the message may be an object or method invocation or call, as will be understood by those familiar with object-oriented software design. Accordingly, a Java or other API-based module may receive the command or data extracted from the input signal and the message may be generated sent to the downloaded application module 1-15 by the Java API-based module.

The downloaded application module 1-15 processes the message received. The operation command or other type of input contained in the message is processed, in accordance with the associated remote control that has been identified as a source of the operation command, and a control of the multimedia terminal is executed at S6.

At S7, an operation signal may be outputted to the output 1-16 and/or to user interface 1-11, and to the output 1-16 may then send the operation signal to the display 1-3, the playback device 1-4 as appropriate to control the multimedia terminal. Further, the operation signal may also be provided to the database 1-2, for example to record a position of the cursor or status of a game feature, and may be transmitted via network 1-9 to a server (not shown) or a cable headend, for example in a quiz show context.

According to an aspect of the present invention, based on the specifications of the downloaded application, the application can decide that a user is not allowed to use specified key or keys of his/her remote control unit for a specified time or for a specified turn. Various techniques for communicating with remote control devices to enable and/or disable their functions can be used. According to an aspect of the present invention, downloaded application simply ignores messages that it determines are based on keys that it considers "disabled" until the keys are enabled again. However, various other solutions are possible. For example, U.S. Published Patent Application No. 2002/0101358, incorporated in full herein by reference, discloses a technique for transmitting code data from a set-top box to a remote control device. This concept can be extended to transmit data for enabling, disabling or otherwise configuring a remote control device to achieve the functionality discussed herein. Also, U.S. Pat. No. 6,774,813, incorporated in full herein by reference, also provides a technique for programming a remote control device. U.S. patent application Ser. No. 09/393,942 (Docket No. PHA-23-773), incorporated in full herein by reference, (equivalent published as WO 01/20572 A1 on Mar. 22, 2001), provides a technique for controlling remotely an electronic device using a mobile station. Generally, a two-way communication can be provided between the multimedia terminal and the remote control devices 1-N, RC-1, RC-2 and RC-3.

Accordingly, at S8, the downloaded application, for instance, can partially or completely disable a remote control by ignoring messages received that are from "disabled" keys. Alternatively, user interface 1-11, according to a control signal from the application can partially or completely disable a remote control. To illustrate, in case of a simple multi-user game, some users can be allowed to use navigation keys and numbers, but not the volume key, while a selected user is granted the authority to use all features. Thus, the application can enable or disable certain groups of keys depending on the mode of operation or other application(s) that are running.

According to an aspect of the present invention, the remote control device 1-N, RC-1, RC-2 and RC-3 can also inform the user that certain keys are inactive, such as by emitting a beep, when the user presses the keys. In addition, the multimedia terminal can provide feedback on the remote control keys that are ignored, such as by displaying a message or audible tone when a command is received but is not executed. In addition, without the need for two-way communications, the application can ignore the commands from all of the devices except one, thereby allowing the user of the selected device to enter commands without interference from the other users. Generally, the application can ignore commands received from some or all of the keys on a remote control device. Thus, commands from some or all of the keys on the remote control device can be disabled in the remote control device itself or in the multimedia terminal or a component thereof, such a the playback device 1-4 or the display 1-3, or in another system under control of the multimedia terminal control 1-1.

It will be understood that a portion of game software or interactive television software module or the like can be preloaded on the multimedia terminal and that therefore downloading a downloadable application, as discussed herein, need not entail downloading all of the software necessary for the application. For example, if the downloaded application comprises a downloaded applet, the applet may contain only a portion of the code necessary for running, for example the game or quiz show application.

At S9, processing is stopped, for example when the end of a game is reached, an interactive television program is ended, or when a user signals that the application is to be stopped.

In this way, among other aspects of the invention, multiple users may enter commands, information, or other types of input to a downloaded application for controlling a multimedia terminal.

Embodiments of the present invention provided in the foregoing written description are intended merely as illustrative examples. It will be understood however, that the scope of the invention is provided in the claims.

What is claimed is:

1. A method of controlling an operation of a multimedia terminal by an application that is down loadable, the method comprising:

downloading via a network the application to the multimedia terminal, wherein the downloaded application is installed to the multimedia terminal or to a device connected with the multimedia terminal;

receiving at the multimedia terminal an input signal from (i) a first remote control device of multiple remote control devices used by a first user of multiple users or (ii) a second remote control device of the multiple remote control devices used by a second user of the multiple users;

sending a message to the downloaded application, the message being generated in response to the input signal and including (i) a command or data extracted from the input signal together with (ii) a source indication, based on the input signal, the source indication indicating whether the input signal was received from the first remote control device used by the first user or the second remote control device used by the second user; and controlling the operation of the multimedia terminal according to the downloaded application based on (a) a processing of the command or data contained in the message by the downloaded application and (b) in accordance with an associated remote control device of the multiple remote control devices that has been identified by the source indication, wherein the downloaded application partially or completely disables all other respective remote control devices by ignoring commands received from the all other respective remote control devices of the multiple remote control devices that are from a key or keys specified by the downloaded application as disabled, for a downloaded application specified time or for a downloaded application specified user's turn, to allow a user of the associated remote control device to enter commands without interference from the all other respective remote control devices of the multiple remote control devices, further comprising transmitting a disable signal to disable a key to at least one of the first remote control device and the second remote control device by the multimedia terminal.

2. The method of claim 1, wherein the message is sent to the downloaded application by an application program interface-based module resident at the multimedia terminal.

3. The method of claim 1, wherein the message further includes a type indication indicating a type of the remote control device from which the input signal was received.

4. The method of claim 3, wherein the type indication indicates at least one of a keypad, a keyboard, a joystick, and a combination thereof.

5. The method of claim 1, wherein said sending of the message includes sending a key indication indicating a key of the remote control device from which the input signal was received.

6. The method of claim 1, wherein the disable signal disables the key for at least one of a specified time and a specified turn of a user.

7. The method of claim 1, wherein the downloaded application is one of a game module and an interactive television module.

8. A non-transitory computer readable medium embodying a program of instructions for controlling an operation of a multimedia terminal by an application that is down loadable, said program comprising: instructions for downloading via a network the application to the multimedia terminal, wherein the downloaded application is installed to the multimedia terminal or to a device connected with the multimedia terminal;

instructions for receiving at the multimedia terminal an input signal from (i) a first remote control device of multiple remote control devices used by a first user of multiple users or (ii) a second remote control device of multiple remote control devices used by a second user of the multiple users;

instructions for sending a message to the downloaded application, the message being generated in response to the input signal and including (i) a command or data extracted from the input signal together with (ii) a source indication, based on the input signal, the source indication indicating whether the input signal was received from the first remote control device used by the first user or the second remote control device used by the second user; and instructions for controlling the operation of the multimedia terminal according to the downloaded application based on (a) a processing of the command or data contained in the message by the downloaded application and (b) in accordance with an associated remote control device of the multiple remote control devices that has been identified by the source indication, wherein the downloaded application partially or completely disables all other respective remote control devices by ignoring commands received from the all other respective remote control devices of the multiple remote control devices that are from a key or keys specified by the downloaded application as disabled, for a downloaded application specified time or for a downloaded application specified user's turn, to allow a user of the associated remote control device to enter commands without interference from the all other respective remote control devices of the multiple remote control devices, and further comprising instructions for transmitting a disable signal to disable a key to at least one of the first remote control device and the second remote control device by the multimedia terminal, the disable signal disabling the key for at least one of a specified time and a specified turn of a user.

9. The medium of claim 8, wherein the instructions for sending the message to the downloaded application comprise an application program interface-based module resident at the multimedia terminal.

10. A system of controlling an operation of a multimedia terminal by an application that is down loadable, the system comprising:

an input signal processor;

an application installer configured to download, via a network, a broadcast stream, another medium, or a combination of these, the application to the multimedia terminal, wherein the downloaded application is installed as a downloaded application module to the multimedia terminal or to a device connected with the multimedia terminal;

a user interface configured to receive at the multimedia terminal an input signal from (i) a first remote control device of multiple remote control devices used by a first user of multiple users or (ii) a second remote control device of the multiple remote control devices used by a second user of the multiple users; and a message generator configured to send a message to the downloaded application, the message being generated in response to the input signal and including (i) a command or data extracted from the input signal together with (ii) a source indication, based on the input signal, the source indication indicating whether the input signal was received from the first remote control device used by the first user or the second remote control device used by the second user, wherein the downloaded application module is configured to control the operation of the multimedia terminal according to the downloaded application based on (a) a processing of the command or data contained in the message by the downloaded application and (b) in accordance with an associated remote control device of the multiple remote control devices that has been identified by the source indication, wherein the downloaded application partially or completely disables all other respective remote control devices by ignoring commands received from the all other respective remote control devices of the multiple remote control devices that are from a key or keys specified by the downloaded application as disabled, for a downloaded application specified time or for a downloaded application specified user's turn, to allow a user of the associated remote control device to enter commands without interference from the all other respective remote control devices of the multiple remote control devices wherein said user interface is configured to transmit a disable signal to disable a key to at least one of the first remote control device and the second remote control device by the multimedia terminal.

11. The system of claim 10, wherein said message generator sends the message to the downloaded application by means of an application program interface-based module.

12. The system of claim 10, wherein said message generator further generates the message to include a type indication indicating a type of the remote control device from which the input signal was received.

13. The system of claim 12, wherein the type is at least one of a keypad, a keyboard, a joystick, and a combination of these.

14. The system of claim 10, wherein said message generator generates the message to include a key indication indicating a key of the remote control device from which the input signal was received.

15. The system of claim 10, wherein the disable signal disables the key for at least one of a specified time and a specified turn of a user.

16. The system of claim 10, comprising an N-th remote control device, N being an integer greater than 2.

17. The system of claim 10, wherein the downloaded application is one of a game module and an interactive television module.

* * * * *